April 2, 1968     C. E. MILLER     3,375,645
LAWN MOWER

Filed June 4, 1965                                         2 Sheets-Sheet 1

INVENTOR
CLYDE E. MILLER
BY
ATTORNEY

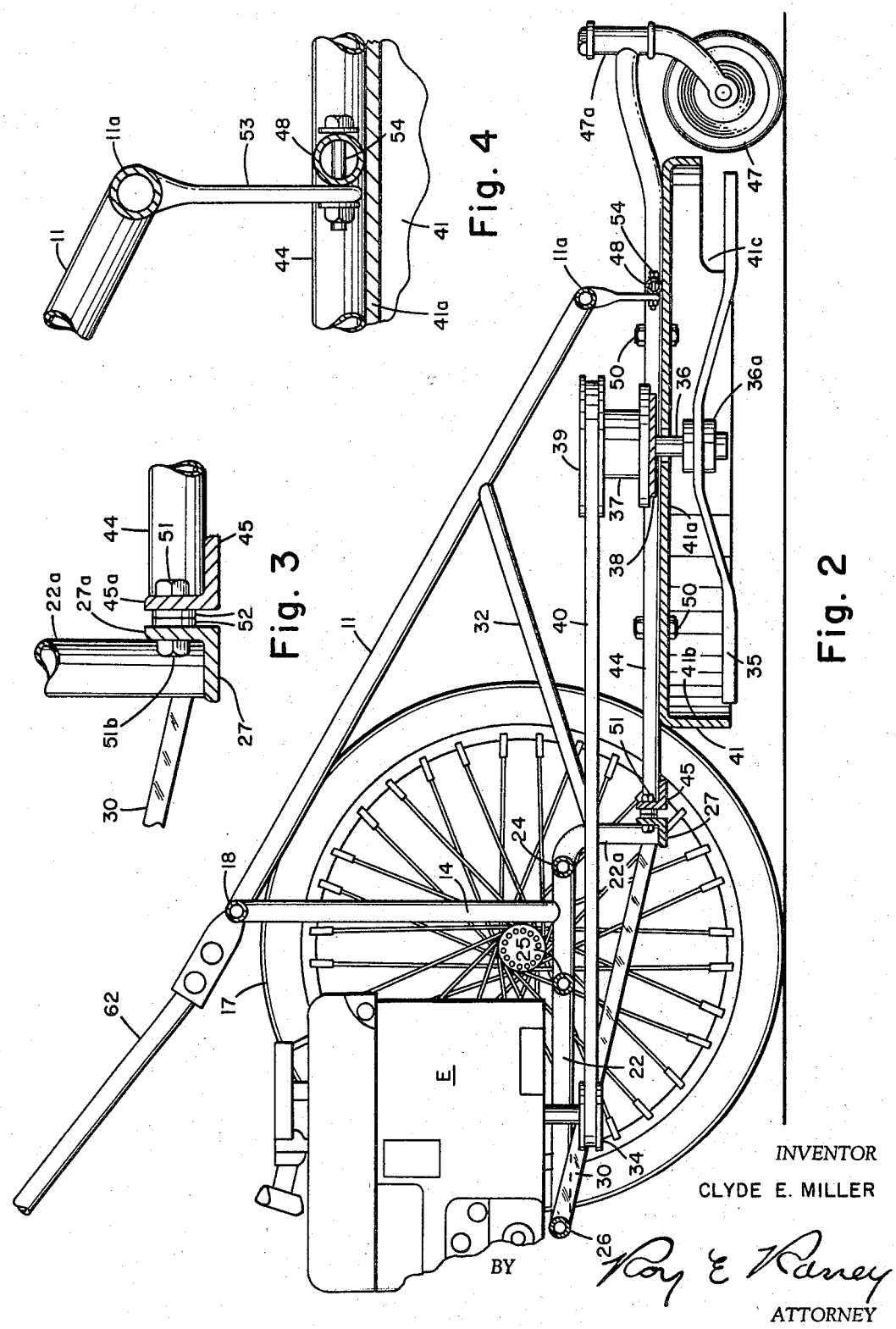

United States Patent Office 3,375,645
Patented Apr. 2, 1968

3,375,645
LAWN MOWER
Clyde E. Miller, Bradenton, Fla., assignor, by mesne assignments, to Locke Manufacturing Companies, Inc., a corporation of Connecticut
Filed June 4, 1965, Ser. No. 461,234
5 Claims. (Cl. 56—25.4)

The present invention relates to an improvement in lawn mowers of the type comprising a frame supported by two main rear wheels of relatively large diameter and front caster wheels, the frame carrying an engine rearwardly thereof which drives a rotary blade supported on a vertical axis in the forward portion of the frame, and the frame having rearwardly extending handles by which the mower is guided.

The principal object of the present invention is the provision of a lawn mower of the type mentioned in which the rotary blade and a guard therefor is capable of tilting about a central longitudinally extending axis whereby the plane of rotation of the blade relative to the ground is controlled by the relative elevations of the two caster wheels and is uneffected by the variations in the level of the axis of the main wheels in the event one or the other passes over irregularities in or on the ground.

More particularly, it is an object of the present invention to provide a lawn mower comprising a main engine carrying frame supported by a pair of main wheels and a sub-frame forwardly of the main frame carrying a rotary blade and supported at its forward end by caster wheels, the sub-frame being pivotally attached to the main frame on a medial longitudinal axis whereby the sub-frame may tilt about its axis independently of the main frame so that the plane of rotation of the blade is determined by the caster wheels and is independent of the level of the rear wheels, within limits.

In carrying out the invention, the main frame supported by two relatively large wheels, comprises a forwardly and downwardly extending member supported by the main wheels and having rearwardly extending hand grips by which the frame is guided and manipulated, the frame member having its forward end pivotally attached to a cross member of a sub-frame, the front end of which is supported by a pair of caster wheels and the rear portion of which has a cross member pivotally attached to a parallel cross bar of the main frame, the centers of the pivots for the two cross members being in alignment so that the sub-frame may pivot about an axis extending longitudinally and centrally of the main frame. This arrangement not only maintains the plane of the cutter blade more nearly parallel to the ground over which it travels, but also provides complete control of the steering and manipulation of the lawn mower and vibration of the rotating blade is largely isolated in the sub-frame so as to provide a smoother and more easily managed mower.

Other objects and advantages of the invention will be apparent from the following description of a preferred form thereof, reference being made to the accompanying drawings wherein:

FIG. 2 is a longitudinal sectional view of the mower, certain parts being broken away or shown in elevation;

FIGS. 3 and 4 are fragmentary sectional views of different parts of the lawn mower shown in FIG. 2, but on a larger scale.

Figure 1:
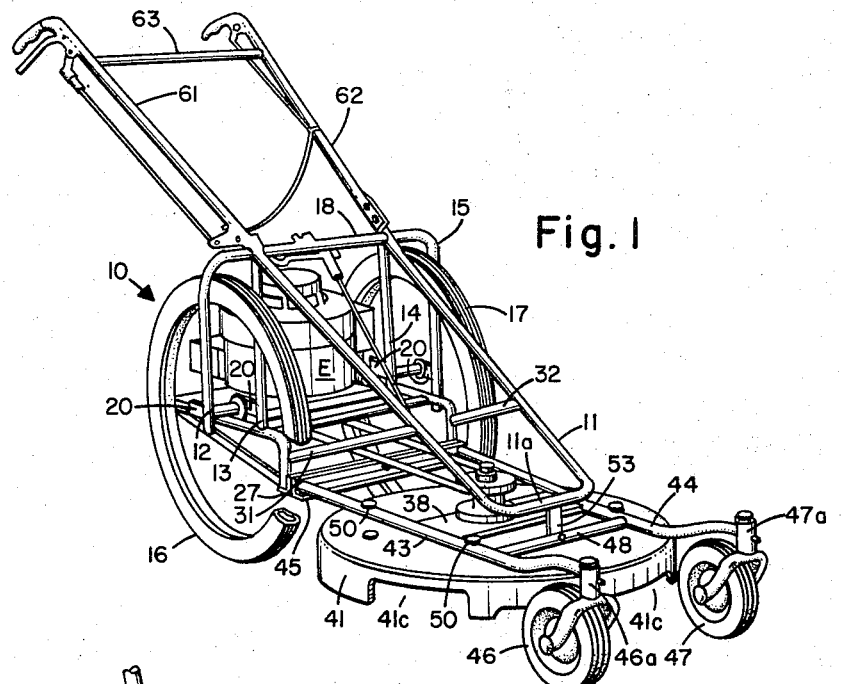
FIG. 1 is a perspective view of a power driven mower embodying the invention, certain parts of the mower being broken away.

A preferred form of the invention is shown embodied in a hand guided lawn mower 10 including a main frame having a U-shaped member 11 sloping forwardly and downwardly supported by two pairs of parallel, upright struts 12, 13 and 14, 15 each pair of struts having a main wheel 16, 17 supported therebetween respectively, by axles which are secured in flanges 20 welded to the struts. Struts 12 and 15 are legs of an inverted U-shape upright frame member 18. The wheels may be of any well known type, further description thereof is deemed unnecessary.

The lower ends of struts 13, 14 are welded to a horizontal frame comprised of two parallel generally horizontally extending tubular members 21, 22 which have downwardly turned forward portions 21a and 22a. Members 21, 22 are interconnected by cross members 24, 25 and 26, and the lower end sections 21a, 22a are welded to a cross member 27 which is preferably of an L-shape iron having a vertical section 27a.

The rear portions of frame members 21, 22 are braced by struts 29, 30 which interconnect the ends of cross bar 27 and cross bar 24, and the forwardly extending member 11 is braced by two struts 31, 32 which are welded to the frame sections 21a, 21b, and to the respective legs of frame member.

The rearwardly extending portion of the main frame, including member 21, 22 support a gasoline engine E which has a drive pulley 34 for driving a rotary cutting blade 35 which is attached to a vertically extending drive shaft 36 for rotation in a horizontal plane as is conventional. The blade is attached to the shaft through a slip clutch 36a and the shaft is rotatably supported vertically in a suitable bearing 37 attached to a plate 38 welded at its end to sub-frame members, described hereinafter. A drive pulley 39 is attached at the upper end of the shaft 36 and is driven by a flexible belt 40 interconnecting the engine pulley 34 and the drive pulley. The blade 35 is enclosed in a circular inverted dish shaped housing or guard 41 which is supported by the sub-frame described more fully hereinafter. Suffice to say, the blade guard 41 has a top wall 41a and depending side walls 41b in which openings 41c are formed for the admission and expelling of grass. The top wall 41a is attached to two spaced parallel sub-frame members 43, 44, the rear ends of which members are welded to a cross bar 45 and the forward ends of which are attached to caster wheels 46, 47 and are rigidly spaced by a tubular cross member 48 welded thereto. The top wall of the housing is bolted to the frames 43, 44 by bolts 50.

The cross bar 45 is similar to cross bar 27 and has an upwardly extending flange portion 45a which lies parallel to the adjacent section 27a of cross member 27 and is pivotally supported thereon by a pivot pin 51 which comprises a bolt having one end threaded and to which a securing nut 51b is secured. A pair of washers 52 are on the bolt and interposed between sections 27a, 45a.

As mentioned previously, the forward ends of frame members 43, 44 are supported by a pair of caster wheels 46, 47 attached thereto, the wheels including upright bushings 46a, 47a to which the frame members are welded. The caster wheels 46, 47 are of conventional construction well known in the art and are notable in that they readily rotate in their bushings to follow swinging movement imparted to the mower by the operator, and it will be seen that they form the support for the forward end of the sub-frame.

Figure 5:
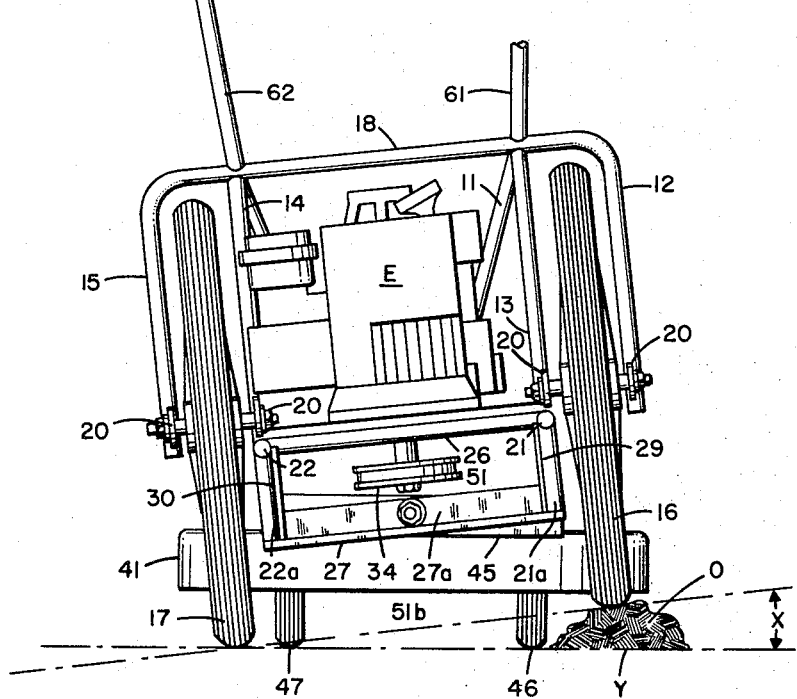
FIG. 5 is a fragmentary rear view in elevation of the mower showing the rear wheels tilted relative to the caster wheels.

The sub-frame cross member 48 is attached to the yoke 11a of the main frame member 11 by a strap 53 the upper end of which is enlarged and welded to the yoke, and the lower portion of which is flattened and depends to the rear of cross member 48 and is attached thereto by a pivot pin 54 which is on the same axis as pin 51 so that the sub-frame supporting the rotary blade 35 pivots about a longitudinal medial axis of the sub-frame and the plane of sweep of the blade will correspond to the level as determined by the two caster wheels 51, 52 and, within limits, is unaffected in this respect by the tilt of the main frame. As may be seen by reference to FIG. 3 should the rear main wheel 16, for example, roll up onto an obstruction O so that the main wheel axis is tilted to the angle X, relative pivoting occurs about the pivot pins 51, 54 and the plane of rotation of the blade 35 will remain parallel to the level Y on which the caster wheels 51, 52 rest, as is clearly seen in FIG. 5. By this construction, the plane of the cutter blade corresponds to the level of the caster wheels only whereby a smooth contour of the lawn cut thereby is effected.

The frame member 11 has handle means bolted thereto and which comprises two members 61, 62 forming integral extensions of the legs of member 11 and having pistol grip type ends rigidly spaced by a cross bar 63. The usual motor controls are provided thereon, the details of which are not necessary for understanding the present invention.

If desired, drive means can be provided by which the main wheels 16, 17 may be driven by the engine; however, this mechanism is not necessary for the practice of the invention and is therefore not described.

By the construction described, the mower blade 35 being unaffected by the tilt of the main frame is maintained more nearly parallel with the ground traversed thereby irrespective of substantial irregularities in the ground, and the suspension thereof of the sub-frame by the pivot means minimizes transmission of vibration from the blade to the main frame and at the same time complete control is provided for steering and other manipulations of the mower.

While I have described but one form of the invention, it is to be understood that other forms, modifications, and adaptations could be made all falling within the scope of the claims which follow.

I claim:

1. A lawn mower comprising a main frame, two spaced wheels attached to said frame for supporting it for movement over the ground, said main frame including a forwardly extending U-shaped member having the yoke portion thereof at the forward end and extending transversely of the mower, hand grip means extending rearwardly of the main frame, and a transversely extending cross bar on said main frame rearwardly of said yoke of said U-shaped member, an engine supported on said main frame, a sub-frame supported at its forward end by caster wheels, a cross bar at the rear end thereof and extending alongside the first mentioned cross bar, pivot means interconnecting the first and second mentioned cross bars at the centers thereof and forming the sole suspension of the rearward end of said sub-frame, means pivotally connecting the forward end of said sub-frame to said forwardly extending main frame member at the yoke portion thereof, the pivot formed by the last mentioned means being coaxial with the first mentioned pivot, a rotary blade supported on said sub-frame and a belt drive between said engine and blade.

2. A lawn mower comprising a main frame including two spaced wheels attached to said frame for supporting it for movement over the ground, a forwardly extending member having rearwardly extending hand grip means, and a transversely extending cross bar, an engine carried on said main frame, a sub-frame comprising two cross bars one at the rear thereof and one forwardly of the other, pivot means interconnecting the first mentioned cross bar and said cross bar at the rear of said sub-frame at the centers thereof and forming the sole suspension of the rearward end of said sub-frame, means pivotally connecting said forward cross bar to said forwardly extending main frame member, the pivot formed by the last mentioned means being on the same axis as that formed by the first mentioned pivot means, a pair of caster wheels supported at the forward ends of said sub-frame, a rotary tween said engine and blade.

3. A lawn mower comprising a main frame, two spaced wheels attached to said frame for supporting it for movement over the ground, said main frame including a forwardly and downwardly extending U-shaped member, and a transversely extending cross bar, an engine on said main frame, a sub-frame comprising two parallel spaced apart longitudinally extending members and a cross bar attached to and interconnecting the rearward ends of said parallel members, a cross member interconnecting said two sub-frame members at the forward ends thereof, a pivot pin interconnecting the first and second mentioned cross bars at the centers thereof and forming the sole suspension of the rearward end of said sub-frame, means pivotally attaching the forward end of said sub-frame to the forward end of said forwardly extending main frame member, the last mentioned means forming a pivot for said sub-frame on a longitudinal axis coaxial with said pivot pin, a pair of caster wheels supported at the forward ends of said two parallel sub-frame members, a rotary blade supported on said sub-frame, and a belt drive between said engine and blade.

4. A lawn mower comprising a main frame, two spaced wheels attached to said frame for supporting it for movement over the ground, said main frame including a forwardly and downwardly extending U-shaped member having the yoke portion thereof at the lower end extending transversely of the mower, hand grip means at the upper ends of said U-shaped member, and a transversely extending cross bar comprising a vertically disposed flange, an engine on said main frame, a sub-frame comprising two parallel spaced apart longitudinally extending members and a cross bar attached to and interconnecting the rearward ends of said parallel members, a cross member interconnecting said two sub-frame members forwardly of said rearward end of said sub-frame, a pivot pin interconnecting the first and second mentioned cross bars at the centers thereof and forming the sole suspension of the rearward end of said sub-frame, means pivoting the forward end of said sub-frame to said forwardly extending main frame members at the yoke portion thereof and comprising a depending strap and a pivot pin extending through said strap and said cross member, the last mentioned pin being on the same axis as the first mentioned pin, a pair of caster wheels supported at the forward ends of said two parallel sub-frame members, a rotary blade supported on said sub-frame, and a belt drive between said engine and blade.

5. A lawn mower comprising, a main frame including a U-shaped frame member sloping forwardly and downwardly with the yoke portion thereof extending transversely of the mower at the lower end thereof, rearwardly extending hand grip means attached to said U-shaped frame member for guiding said mower, a U-shaped strut member having the yoke portion extending transversely of and attached to the upper end of said U-shaped frame member and having the legs thereof extending downwardly to provide outside wheel struts, a pair of inner struts having the upper ends thereof attached to the yoke of said U-shaped strut member and depending parallel to and spaced inwardly from the respective outside wheel struts of said U-shaped strut member, a relatively large supporting wheel journaled between each pair of inner and outer struts and attached thereto, two parallel horizontal frame members extending normal to and attached at the intermediate portions thereof to the lower ends of said inner struts, said horizontal frame members having the forward ends turned downwardly, a cross bar L-shape in cross section interconnecting said downwardly extending forward ends of said horizontal frame members with the downwardly extended ends abutting one flange of said cross bar and the other flange of said cross bar abutting a side of said downwardly extended end portions, said parallel horizontal frame members being interconnected by a cross member at the rear ends thereof and a cross member adjacent to the downwardly turned ends thereof, a pair of brace members interconnecting the legs of said U-shape frame member and said downwardly extending portions of said horizontal frame members respectively, a pair of brace members interconnecting said cross bar and the rearward ends of said horizontal frame members, an engine supported on said horizontal frame members, said engine including a downwardly extended drive pulley, a sub-frame comprising two parallel horizontal guard and blade support members, a cross bar L-shape in transverse section interconnecting the rearward ends of said parallel sub-frame members with the ends thereof abutting one flange of the last mentioned cross bar and a side adjacent the last mentioned ends abutting the other flange of the last mentioned cross bar, two caster type wheels attached to the forward ends respectively of said parallel sub-frame members for supporting the forward end of said sub-frame, said cross bars being disposed co-extending with said second flange of the first mentioned cross bar parallel and adjacent to said second flange of the first mentioned cross bar, a pivot pin pivotally attaching said two cross members together at the centers thereof whereby said sub-frame is pivotally supported at the rear end thereof for tilting about a longitudinal medial axis of said mower, a cross member attached to said parallel sub-frame members rearwardly of said caster wheels and beneath the yoke portion of said U-shaped frame member, a strap depending from the last mentioned yoke portion, a pivot pin interconnecting said strap and the last mentioned cross member for pivotally attaching the latter to said strap on an axis co-axial with the first mentioned pivot pin, an inverted dish shaped mower blade guard housing having its circular plane wall bolted to the underside of said horizontal parallel sub-frame members, a plate interconnecting said two horizontal parallel sub-frame members and rigidly attached thereto, a shaft bushing and extending through said guard housing and having a drive pulley at the upper end thereof and a blade attached to the lower end thereof inside said housing, and a flexible belt interconnecting said pulleys.

References Cited

UNITED STATES PATENTS

| | | | |
|---|---|---|---|
| 2,478,558 | 8/1949 | Beranek et al. | 56—25.4 |
| 2,504,259 | 4/1950 | Ford | 172—43 |
| 2,816,496 | 12/1957 | Hall | 172—256 |

ANTONIO F. GUIDA, *Primary Examiner.*

ABRAHAM G. STONE, *Examiner.*

P. RAZZANO, *Assistant Examiner.*

UNITED STATES PATENT OFFICE
CERTIFICATE OF CORRECTION

Patent No. 3,375,645                            April 2, 1968

Clyde E. Miller

It is certified that error appears in the above identified patent and that said Letters Patent are hereby corrected as shown below:

Column 3, line 75, strike out "tween said engine and blade." and insert instead -- blade supported on said sub-frame, and a belt drive between said engine and blade. --.

Signed and sealed this 15th day of July 1969.

(SEAL)
Attest:

Edward M. Fletcher, Jr.                      WILLIAM E. SCHUYLER, JR.
Attesting Officer                              Commissioner of Patents